United States Patent
Ritter et al.

(10) Patent No.: US 10,999,286 B2
(45) Date of Patent: May 4, 2021

(54) IN-CAR ENROLLMENT

(71) Applicant: VOLKSWAGEN AG, Wolfsburg (DE)

(72) Inventors: Stephan Ritter, Braunschweig (DE); Sarah Boroske, Braunschweig (DE); Lena Fromhage, Braunschweig (DE); Stefan Winger, Meine (DE)

(73) Assignee: Volkswagen AG

( * ) Notice: Subject to any disclaimer, the term of this patent is extended or adjusted under 35 U.S.C. 154(b) by 346 days.

(21) Appl. No.: 15/204,494

(22) Filed: Jul. 7, 2016

(65) Prior Publication Data
US 2017/0012989 A1  Jan. 12, 2017

(30) Foreign Application Priority Data

Jul. 10, 2015 (EP) .................................... 15176247

(51) Int. Cl.
*H04L 29/06* (2006.01)
*G06F 3/0484* (2013.01)
*H04L 29/08* (2006.01)

(52) U.S. Cl.
CPC .......... *H04L 63/102* (2013.01); *G06F 3/0484* (2013.01); *H04L 63/08* (2013.01); *H04L 63/123* (2013.01); *H04L 67/12* (2013.01); *H04L 67/16* (2013.01)

(58) Field of Classification Search
CPC ............................... G06Q 10/00; G06Q 50/30
See application file for complete search history.

(56) References Cited

U.S. PATENT DOCUMENTS

| 9,398,454 | B1 * | 7/2016 | Burcham | H04W 12/06 |
| 2005/0027438 | A1 * | 2/2005 | Rockett | G08G 1/205 |
| | | | | 701/532 |
| 2007/0191995 | A1 | 8/2007 | Laghrari | |
| 2011/0208386 | A1 * | 8/2011 | Jiang | G07C 5/008 |
| | | | | 701/31.4 |
| 2015/0111529 | A1 * | 4/2015 | Johnson | H04W 4/90 |
| | | | | 455/406 |

FOREIGN PATENT DOCUMENTS

WO  2015057874 A2  4/2015

OTHER PUBLICATIONS

Search Report for European Patent Application No. 15176241.3; dated Jan. 12, 2016.

* cited by examiner

*Primary Examiner* — Jason K Gee
(74) *Attorney, Agent, or Firm* — Barnes & Thornburg LLP

(57) ABSTRACT

A method for enrolling a user of a vehicle to a first server, wherein the vehicle includes a system having at least a user interface. The method provides a wireless connection between the vehicle and the first server; sends user data to the first server in response to user actuation on the user interface; and receives at the user interface an enrollment confirmation from the first server.

15 Claims, 9 Drawing Sheets

[Form with Name and Surname fields, labeled "Registration"]

FIG. 5a
PRIOR ART

[Form with Validation code field]

FIG. 5b
PRIOR ART

IN-CAR ENROLLMENT

PRIORITY CLAIM

This patent application claims priority to European Patent Application No. 15176247.3, filed 10 Jul. 2015, the disclosure of which is incorporated herein by reference in its entirety.

SUMMARY

Illustrative embodiments relate to a system, components, and methodologies for in-car enrollment.

BRIEF DESCRIPTION OF THE DRAWINGS

Disclosed embodiments may be better understood with reference to the following drawings and description. The components in the figures are not necessarily to scale, emphasis instead being placed upon illustrating the principles of the disclosed embodiments. Moreover, in the figures, like referenced numerals designate corresponding parts throughout the different views.

FIGS. 5a and 5b show example screens from a conventional user enrollment;

DETAILED DESCRIPTION

Figure 1:
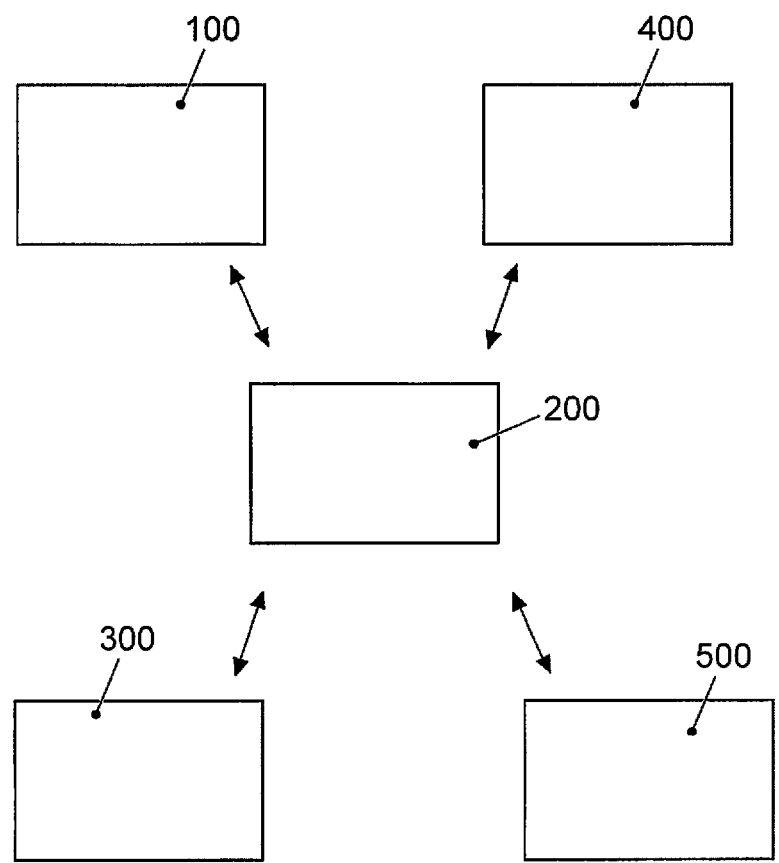
FIG. 1 is a conventional system for enrolling a user of a vehicle to a server.

According to the disclosed embodiments, in-car enrollment is provided.

Under enrollment of a vehicle is to be understood the process of registration of a user of the vehicle with a backend server of a vehicle manufacturer, the process of associating, pairing or allocating the vehicle to the registered user, and the process of verifying the correctness of the data input. Once a user is enrolled, associated offline or online services (e.g., online traffic information, news or weather information) may be accessed by the user from the associated, paired or allocated vehicle. It should be noted that a part of offline and online services may be accessed by a user without requiring the user to be enrolled (e.g., Teaser-services).

The conventional way of enrollment of a vehicle is implementing a process of registration of the user via a web portal (e.g., Europe, China) or via a call center (e.g., USA). This conventional way is cumbersome for a user and prone to errors. For instance, the user is required to input the vehicle identification number (VIN) via the customer web portal or to provide the VIN to the person of the call center. In addition, at least a further "validation code" is to be provided to the user who in turn has input the provided "validation code" at the vehicle. Moreover, a complex infrastructure (e.g., at least an additional server, hot line services, human resources, etc.) as web portal or call center is to be provided and maintained. US 2005/0027438 A1 relates to enrollment and activation of mobile telematics systems. WO 2015/057874 A2 describes a method for enrolling a device in a cellular subscription and billing plan of a user. US 2007/191995 describes a vehicle email notification system.

Therefore, there is a need for improving the conventional way of enrollment of a vehicle, maintaining at the same time the necessary security regarding the exchange of data.

The application provides a method for enrolling a user of a vehicle to a first server, wherein the vehicle comprises at least a user interface, the method comprising providing a wireless connection between the vehicle and the first server; sending user data to the first server in response to user actuation on the user interface; and receiving at the user interface an enrollment confirmation from the first server.

The method further comprises generating a user account at the first server, wherein the user account includes the user data sent by the user of the vehicle.

The method further comprises sending data related to the vehicle, wherein the user account includes the data related to the vehicle. The sending of data related to the vehicle may automatically be performed in response to user actuation on the user interface provided at the vehicle. In this manner, a user is not required to input, for example, the cumbersome identification number of the vehicle (VIN).

The method further comprising prior to receiving at the user interface an enrollment confirmation from the first server: generating a message at the first server, the message comprising an activation or confirmation link; and sending the message to the device using the identification of the device (wherein user data previously sent includes the identification of the device); and wherein the enrollment confirmation is only sent to the user interface at the vehicle if the confirmation link is actuated at the determined device. In this manner, a double confirmation opt-in is provided to verify that the user data previously sent has correctly been associated and stored in the corresponding user account. For instance, a user may wrongly input a cell phone number. According to the principles of the claimed solution, an exchange of messages may be achieved between the backend server and the system at the vehicle to verify that the user has registered the correct cell phone number.

The method further comprises making available services to the user of the vehicle if an enrollment confirmation from the first server is received at the user interface. The services are only made available to the user at the vehicle from an external server via the first server. In this manner, control of the data exchanged is provided. Alternatively or in addition, the services may directly be made available to the user of the vehicle from an external server when using a secure connection.

Disclosed embodiments further provide a system for enrolling a user of a vehicle to a server, the system configured to perform the above mentioned operations.

Via a user interface provided in a system of the vehicle, the process of the enrollment of the vehicle may easily be achieved by a user within the vehicle itself. This user interface may be embedded for instance in a navigation device of the vehicle.

The user interface for initiating the enrollment process may be activated in response of user input. The user input that triggers the enrollment process may be a mechanical button (e.g., a car-net button) provided in the vehicle. Alternatively or in addition, the enrollment process may be triggered by user input, for example, activating a service which is still inactivated (i.e., a service provided to the user at the user interface within the vehicle but that requires a valid enrollment of the user). A further user input which may trigger the enrollment process may be provided as a virtual button in a touch display device.

A faster enrollment process is in this manner provided, since data exchanged between the vehicle and the backend server of the vehicle manufacturer is reduced. For instance, no input of the VIN is required, the registration is thus easier and faster, thereby preventing user input errors. Since no input of VIN is required, further processing operations at the backend server of the vehicle manufacturer like searching a VIN in, for example, a database of the backend server of the vehicle manufacturer are further prevented. Moreover, no activation/validation codes are further required to be generated and sent by the backend server to the user by means of, for example, the web portal, and in turn no validation/activation codes are required to be input by the user in the user interface within the system provided at the vehicle. In summary, waste of bandwidth between the involved components and user input errors are efficiently prevented.

In this manner, a simplified activation of offline and/or online services which may be provided by an external server is efficiently provided. It should be noted that those offline and/or services may be provided via the backend server of the vehicle manufacturer to ensure a central management of the data exchanged. This enhances the security of the data exchanged. Alternatively or in addition, data may be directly exchanged between the external server and the vehicle by using a secure connection.

Moreover, by means of an iterative activation or unlocking of offline and/or online services, the user of the vehicle may easily configure the services to be accessed from the enrolled vehicle.

In this context, at least one authorization/authentication/encryption technology (e.g., authentication security technology based on Near-Field Communication (NFC), RFID, exchange of digital keys, PKI, PGP, etc.) may be used to enhance the security of the data exchanged between the involved components of the claimed system.

The enrollment process assumes that the vehicle is wireless connected to the backend server of the vehicle manufacturer via a telecommunications network. The wireless connection to the telecommunications network may be provided by means of conventional connection (e.g., WLAN, CarStick—USB comprising a SIM card with information that enables wireless connection, embedded SIM with information that enables a wireless connection, etc.).

Furthermore, in response to user input (by means of a mechanic or a virtual button), the enrollment process may be triggered. In this manner, a user interface is provided to the user at the vehicle. In this context, the user is required to input, for example, name, surname, e-mail address, user name, cell phone number, password, S-PIN (i.e., an optional user-defined PIN not limited to, for example, a 4-digit number for enabling additional services and/or settings), date of birth, address, usability of the vehicle, etc. Furthermore, the user may be required to acknowledge the proposed terms and conditions relative for instance to the use of the vehicle and/or to the proposed protection of data privacy. In this manner, no additional devices like a computer device are required to register the user with the backend server.

In addition, once the user is registered, a process of associating, pairing or allocating the vehicle to the registered user is provided from the user interface within the system arranged within the vehicle itself. This process of associating, pairing or allocating the vehicle to the user may be automatically provided at the user interface or in response to a further user input. It should be noted that the process of associating, pairing or allocating the vehicle to the registered user may be independent of the registration of the user with the backend server of the vehicle manufacturer. In this context, unnecessary data exchange is reduced and potential user input error are prevented. For instance, the user is not required to provide the VIN (via the web portal or the person of the call center). In this manner, no additional devices like a computer device and/or human resources are required to register the user with the backend server. Moreover, the provision and maintenance of a web portal (including at least a necessary server) or call center (including human resources) is prevented according to the claimed solution.

Alternatively, the above described process of associating, pairing or allocating the vehicle to the registered user may be provided by requiring the user to input the VIN and a validation code. The validation code may be provided by the backend server of the vehicle manufacturer in a conventional manner. The validation code may comprise, for example, an 8-digit number.

Once the above indicated operations are completed, the server or backend may generate a user account and may provide means for verifying the correctness of the input data associated with the generated user account. For instance, by means of the well-known double opt-in (DOI) confirmation, where the backend server of the vehicle manufacturer sends a message (e.g., an e-mail, an sms) containing a link for completing the enrollment process. The message is to be sent to the one or more of the devices associated with the registered user by using the identification of the device provided by the registered user of the vehicle (e.g., an e-mail address, a cell phone number). The device may therefore be a computer device, a smartphone or the like. In this manner, the registered user may receive, for example, an email at the input email address or a sms at the given cell phone number to confirm the correctness of the input data.

FIG. 1 is a conventional system for enrolling a user of a vehicle 100 to a server 200 of the vehicle manufacturer. The server 200 may be accessible over a telecommunications network, e.g., the Internet. A system included in the vehicle 100 including for instance a navigation device with a user interface may access the server 200 via the telecommunications network. A device 300 may be identified by the user data sent from the vehicle 100 to the server 200. In this manner, the server 200 may communicate with the device 300 via the telecommunications network by using the identification of the device 300. The device 300 may be a mobile communication device (e.g., a computer device, a smartphone or the like). An external server 400 may be supplied to provide online and/or offline services to the vehicle 100. The online and/or offline services may include but are not limited to, for example, online traffic information, news or weather information. In addition, an infrastructure 500 may be supplied to enable a user to enroll a vehicle. This infrastructure includes at least a server and/or human resources for a hotline service.

Figure 2:
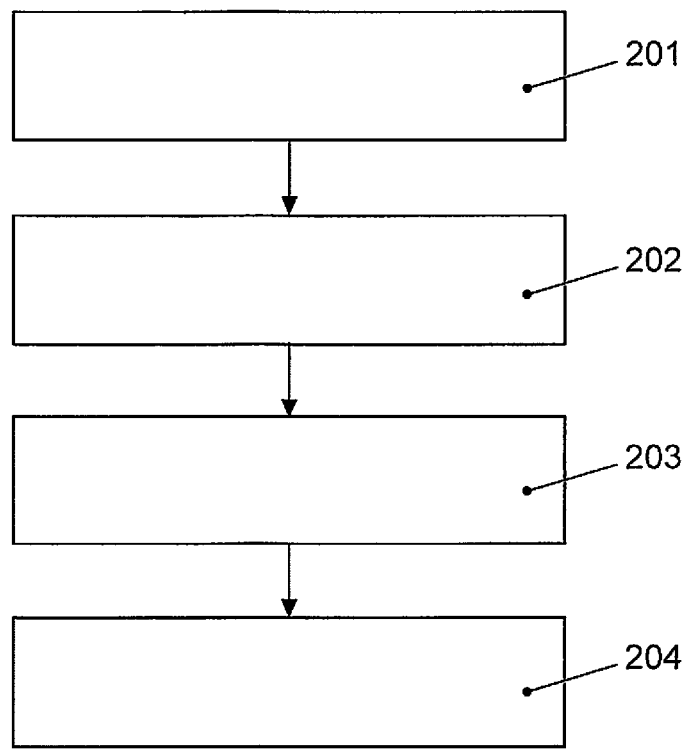
FIG. 2 is a flowchart depicting a conventional method for enrolling a user of a vehicle to a first server.

FIG. 2 is a flowchart depicting a conventional method for enrolling a user of a vehicle to a server. In a first operation at 201, a user may provide the required user data for an enrollment via a web portal or a call center. Part of the required user data is necessarily the identification of the vehicle number (VIN) and the identification (e.g., an email address or a cell phone number) of a device 300 for confirming the enrollment. At the operation at 202, a server responsible for the enrollment process generates a message including a confirmation link. This message is sent to the device 300 by means of the provided identification of the device. Once, the confirmation link is activated at the device 300, operation at 203, a confirmation message is sent to the server. In this manner, at the operation at 204, the system provided in the vehicle 100 is enabled to receive suitable content and/or offline and/or online services which may be provided by an external server 400.

Figure 3:
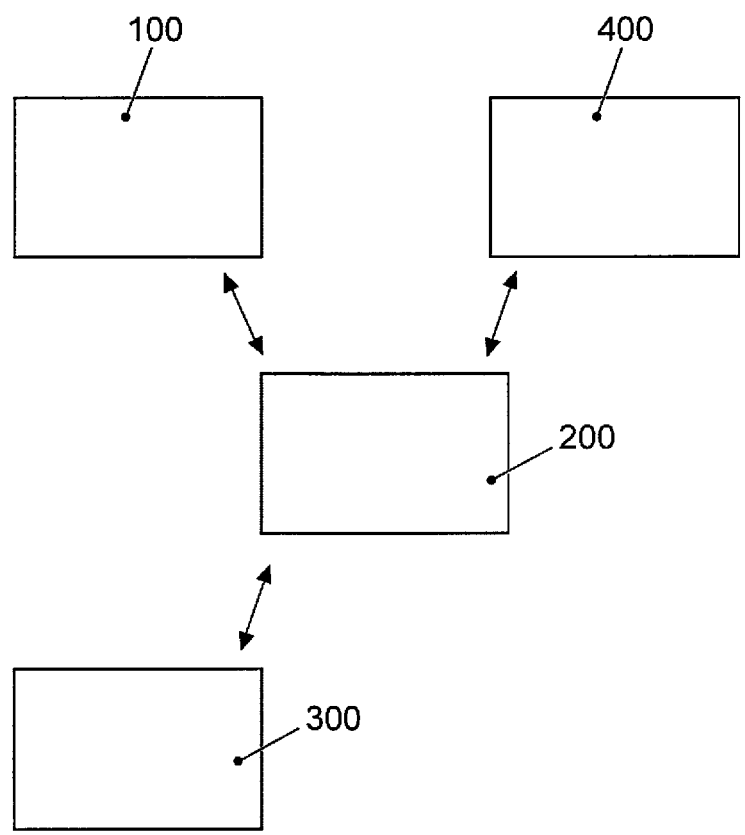
FIG. 3 is a system for enrolling a user of a vehicle to a first server according to a disclosed embodiment.

FIG. 3 is a system for enrolling a user of a vehicle to a first server or backend server 200 according to a disclosed embodiment. The first server or backend server 200 may be provided with a storage unit to keep record of the enrolled users. As can be seen when compared this FIG. 3 to the conventional system as shown at FIG. 1, no complex infrastructure 500 is required, since the enrollment process, as described above, may be performed from a system provided in the vehicle 100. In addition, it should be noted that the external server 400 is only allowed to communicate to the vehicle 100 via the backend server or first server 200.

Figure 4:
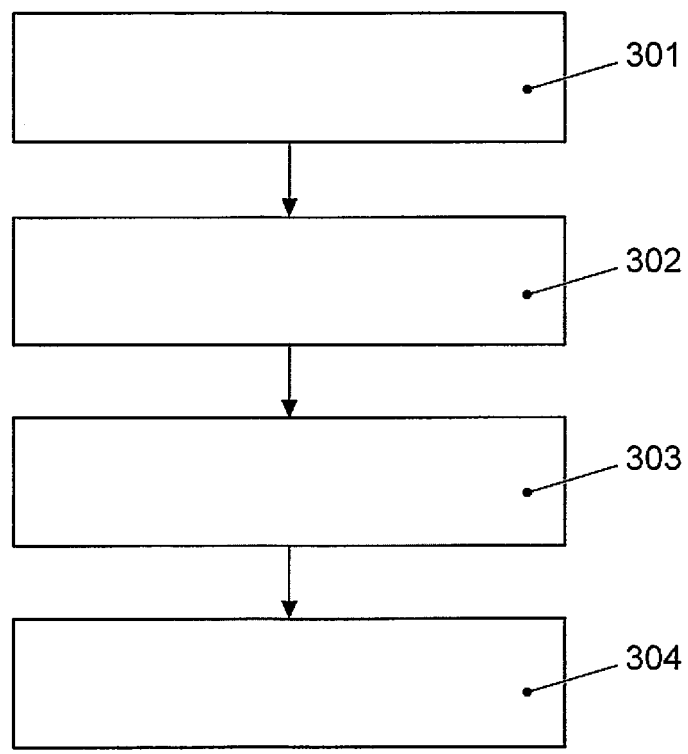
FIG. 4 is a flowchart depicting a method for enrolling a user of a vehicle to a first server according to a disclosed embodiment.

FIG. 4 is a flowchart depicting a method for enrolling a user of a vehicle to a first server or backend server 200 according to a disclosed embodiment. In a first operation at 301, a user may provide the required user data (including the identification (e.g., an email address or a cell phone number) of a device 300 for confirming the enrollment) for an enrollment via a user interface provided in a system of the vehicle 100 itself. In this manner, part of the required data related to the vehicle which is necessary for the identification of the vehicle 100 may automatically be sent without user input, thereby efficiently preventing in turn user input errors. For instance, once triggered the enrollment process, the VIN may automatically be sent as part of the user data and this information may automatically be stored in the user account that is to be generated at the first server of backend server 200. It should be noted that the user data sent from the vehicle 100 to the first server of backend server 200 may include and is not limited to data related to the process of registry of the user of the vehicle 100 with the first server of backend server 200 and to data related to the process of associating/pairing/allocating of the user with the vehicle 100. At the operation at 302, the first server of backend server 200 which is the main and central responsible for the enrollment process generates a message including a confirmation link. This message is sent to the device 300 by means of the provided identification of the device 300. Once, the confirmation link is activated at the device 300, operation at 303, a confirmation message is sent to the first server of backend server 200. In this manner, at the operation at 304, the system (user interface) provided at the vehicle 100 is enabled to receive suitable content and/or online and/or offline services which may be provided by an external server 400 only via the first server of backend server 200. In other words, no exchange of data is directly achieved between the external server 400 and the vehicle 100. Alternatively or in addition, a direct exchange of data, content and services may be indeed achieved between the external server 400 and the vehicle 100 by using a secure connection. A secure connection may be provided, for example, by exchanging digital signatures.

It should be noted that the operations as shown in FIG. 4 are illustrative and may be performed contemporaneously or in a different order other than presented in FIG. 4.

FIGS. 5*a* and 5*b* show example screens from a conventional user enrollment. For instance, as shown in FIG. 5*a*, a user may input "Name" and "Surname". User data may be sent by means of conventional mechanical and/or "touch-screen" buttons. In the same manner, as shown in FIG. 5*b*, a "validation code" may be input. This "validation code" may be sent from the server responsible to the conventional enrollment process to the device identified by the user to confirm the enrollment. In this manner, the user is required to further input a validation code to complete the enrollment process.

By contrast, according to the principles of the claimed solution, no input of at a least a validation code is necessary, thereby preventing further user input errors and reducing the amount of data exchange between the involved components of the system for enrolling a vehicle. As described above, the required user data is provided by the user of the vehicle by means a of user interface provided in a system of the vehicle itself. Thus, no validation code is necessary to be input. The confirmation regarding the user data sent by the user is achieved by the above described double opt-in confirmation message.

Figure 6:
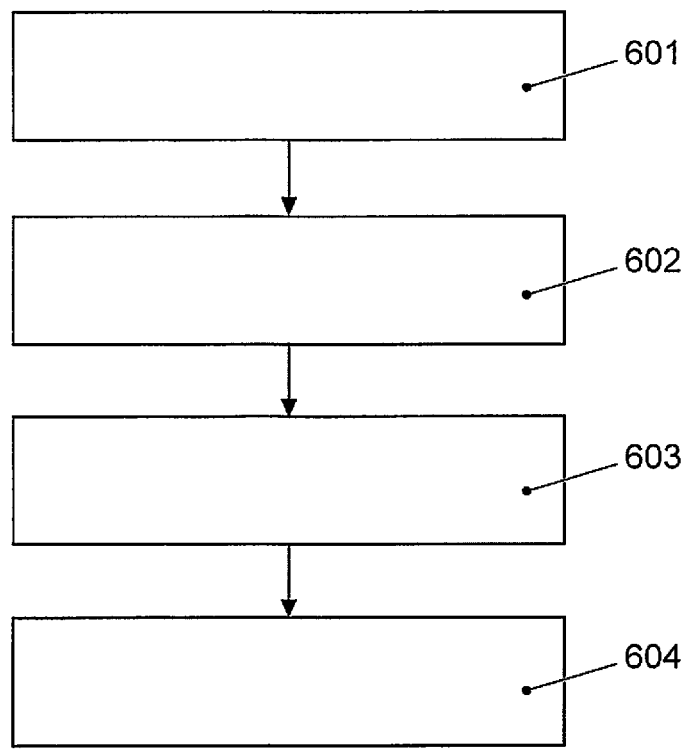
FIG. 6 is a flowchart depicting a conventional method for enrolling a user of a vehicle to a first server.

FIG. 6 is a flowchart depicting a conventional method for enrolling a user of a vehicle to a first server. At the operation at 601, a wireless connection may be provided by means of, for example, WLAN, CarStick—USB comprising a SIM card with information that enables a wireless connection and/or an embedded SIM with information that enables a wireless connection, etc. At the operation at 602, registration of the user takes place. At the operation at 603, a validation code is received via a web portal in a conventional enrollment process as outlined above. Thus, at the operation at 604, this validation code is required to be input by means of the system provided at the vehicle itself.

According to a disclosed embodiment of the present application, regarding the above described operation at 601 when compared to a conventional enrollment process, a connection wizard for enabling the wireless connection may be provided according to the principles of the claimed solution if a factory setting is necessary, if a user actuates on an inactive service (i.e., a service provided but still not available to the user since an enrollment is required) at the user interface at the system provided within the vehicle and/or if a user is still not enrolled.

It should be noted that the operations as shown in FIG. 6 are illustrative and may be performed contemporaneously or in a different order other than presented in FIG. 6.

Figure 7A:
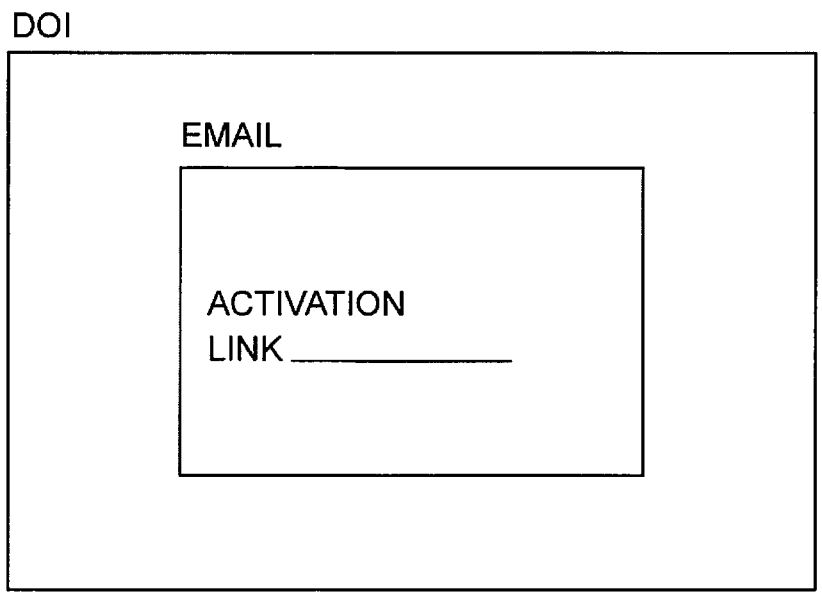
FIGS. 7a and 7b show example screens from a double opt-in confirmation.
Figure 7B:
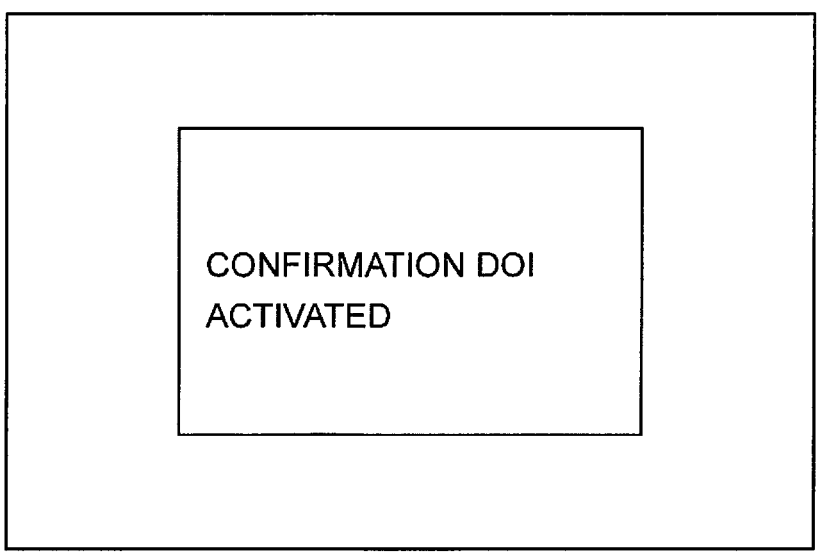

FIGS. 7*a* and 7*b* show example screens from a double opt-in confirmation message. For instance, as shown in FIG. 7*a*, a user may receive at a determined device 300 (e.g., a computer device, a smartphone or the like) a message (e.g., an email or an sms), wherein the message includes an activation or confirmation link. In the same manner as shown in FIG. 7*b*, a double opt-in confirmation may be activated by merely actuating on the provided activation or confirmation link.

Figure 8:
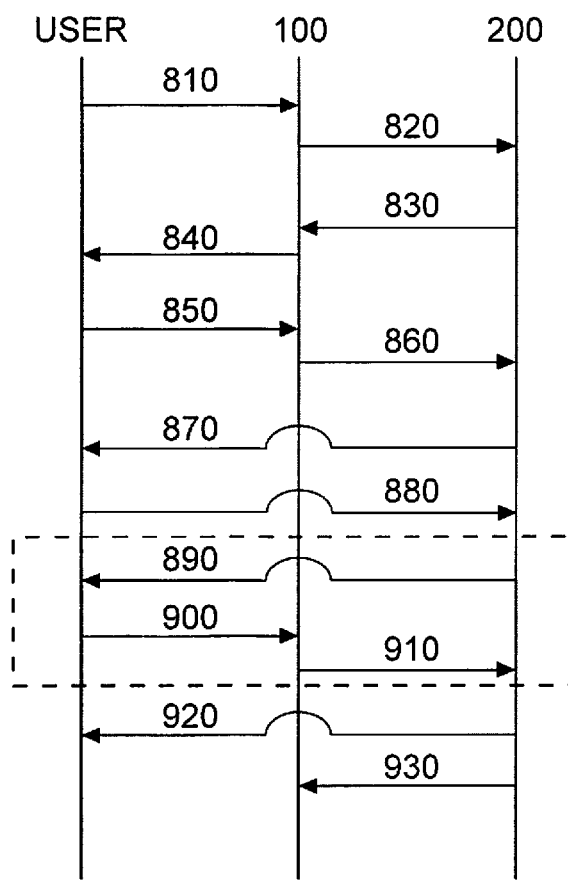
FIG. 8 is a diagram of message flows among the components of a system for enrolling a user of a vehicle to a first server according to a disclosed embodiment.

FIG. 8 is a diagram of message flows among the components of a system for enrolling a user of a vehicle to a first server according to a disclosed embodiment. FIG. 8 illustrates exemplary messages illustrating the flow between different components of the system as shown in FIG. 3. An example of message flow that may result when a user performs a user registration (as part of the claimed process for enrolling a user of a vehicle 100 to a first server or backend server 200) is depicted. It should be noted that the claimed user interface has also been referenced as 100 for simplifying the illustrative purpose. In this example, a user may trigger 810 the user registration by means a car-net button provided at the vehicle 100. This car-net button may be provided as a specific mechanical button at the vehicle 100, a mechanical button part of the user interface and/or as a touch-screen button at a display device provided at the vehicle 100. The user may further trigger 810 the user registration by actuating on an inactive service at the user interface provided at the system at the vehicle 100. An inactive service is a service provided to the vehicle 100 but not available to the user of the vehicle 100 until the user completes an enrollment process. The user interface may comprise a set of menus and/or submenus that provide options to the user to configure, for example, the settings of the user interface and/or content and/or offline and/or online services to be accessed from the vehicle 100. The user may further trigger 810 the user registration by actuating on a predetermined option at the menu and/or submenu at the user interface. Once the user triggers the registration process, as a part of the enrollment process, the system provided at the vehicle 100 establishes 820 a wireless connection with the backend server or first server 200. In response to the triggering of user registration, the backend server or first server 200 requests 830 user data to the user by means of the system provided (i.e., user interface) at the vehicle 100. The required user data may be configured at the backend server or first server 200 and is not limited to data related to the user: e.g., name, surname, e-mail address, user name, cell phone number, password, S-PIN (optional user-defined PIN not limited, for example, to a 4-digit number for enabling additional services), date of birth, address, usability of the vehicle, etc. The request of user data is for instance displayed 840 at the user interface. The user may therefore easily input 850 the requested data at the user interface. The input data by the user is in turn sent 860 to the backend server or first server 200. It should be noted that the request and sending of user data may be provided in multiple messages depending on for instance the size of the display device at where the user interface is provided at the vehicle 100.

As a result of the exchange of messages between the user and the backend server or first server 200 by means of the system provided (i.e., the user interface) at the vehicle 100, the backend server or first server 200 generates a user account with the user data input by the user at the operation at 850 together with data related to the vehicle 100 (for instance the VIN), wherein data related to the vehicle 100 is automatically sent by the vehicle 100 without requiring an explicitly user input of the user. For instance, the VIN may be set as an initial setting at the factory and may be stored at a storage unit of the vehicle 100. The VIN may be sent from the storage unit of the vehicle 100 to the backend server or first server 200 in response to an actuation of the user on the provided user interface and/or in response to a request of the backend server or first server 200. Analogously, further additional data related to the vehicle may be provided to the backend server of first server 200.

Once a user account is generated by the backend server or first server 200, a message as a double opt-in confirmation message (i.e., a message comprising an activation or confirmation link) is generated by the backend server or first server 200 and sent 870 to the user to the determined device 300. To enable the communication between the backend server or first server 200 and the device 300, the user is requested at the operation at 830 to input inter alia the identification (e.g., an email address or a cell phone) of the device 300. In this manner, the identification of the device 300 is to be understood as a means that enables the device 300 to be reached by the backend server or first server 200. The double opt-in confirmation message may be accepted 880 and thus a message is sent to the backend server or first server 200.

It should be noted that the above described operations at 870 and 880 may be performed prior to generating a user account. In other words, the backend server or first server 200 may generate the user account after the double opt-in confirmation has been achieved.

Once the user account has been generated and confirmed by the user (using, for example, the device 300), the conventional enrollment process, as shown as messages' flow 890, 900 and 910, requires further exchange of messages. The backend server or first server 200 is required to generate and send a "validation code" to the device 300 of the user. Thereafter, the user is required to input 900 the received "validation code" at the user interface at the system provided at the vehicle 100, which is in turn sent 910 to the backend server or first server 200 to verify the correctness of the input "validation code".

By contrast, according to the principles of the claimed solution, no "validation code" is to be generated and sent by the backend server or first server 200. This reduces the usage of bandwidth. Furthermore, no "validation code" is required to be manually/specifically input by user. This further reduces potential user input errors. In other words, the shown messages 890, 900 and 910 are effectively prevented according to the claimed solution.

Thus, to complete the registration process of the user only one confirmation message 930 is to be sent from the backend server or first server 200 to the user interface of the vehicle 100. In this manner, the user is informed. In addition, an optional message 920 may be sent to the device 300 to inform the user regarding the completeness of the registration process.

It should be noted that the operations as shown in FIG. 8 are illustrative and may be performed contemporaneously or in a different order other than presented in FIG. 8.

Figure 9A:
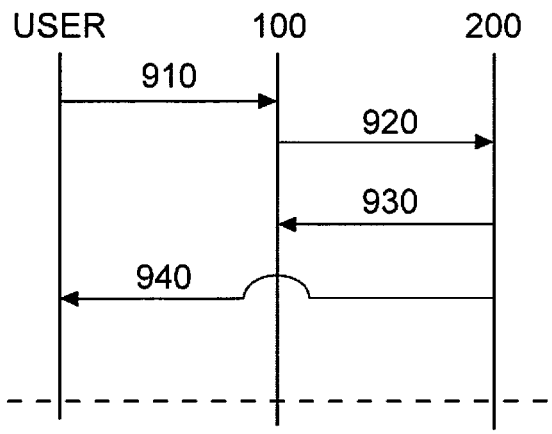
FIGS. 9a and 9b are diagrams of message flows among the components of a system for enrolling a user of a vehicle to a first server according to a disclosed embodiment.
Figure 9B:
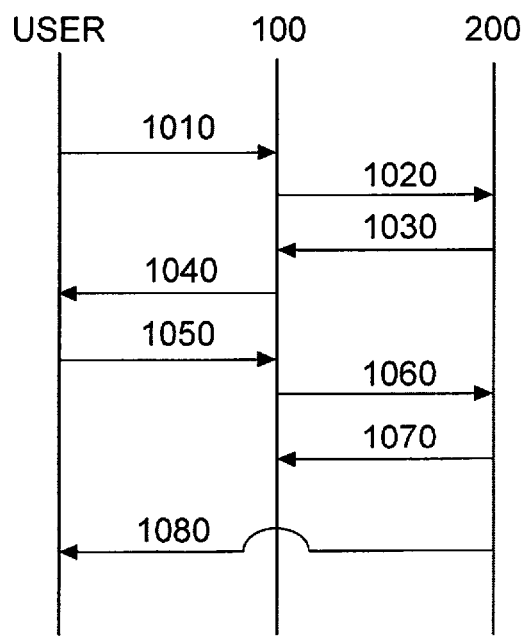

FIGS. 9*a* and 9*b* are diagrams of message flows among the components of a system for enrolling a user of a vehicle to a first server according to a disclosed embodiment.

FIG. 9*a* illustrates exemplary message illustrating the flow between different components of the system as shown in FIG. 3. An example of message flow that may result when a user performs a vehicle allocation (pairing or association) (as part of the claimed process for enrolling a user of a vehicle 100 to a first server or backend server 200) is depicted, when this vehicle allocation is immediately performed after a user registration as shown in FIG. 8. It should be noted that the claimed user interface has also been referenced as 100 for simplifying the illustrative purpose.

Furthermore, FIG. 9*b* illustrates exemplary message illustrating the flow between different components of the system as shown in FIG. 3. An example of message flow that may result when a user performs a vehicle allocation (pairing or association) (as part of the claimed process for enrolling a user of a vehicle 100 to a first server or backend server 200) is depicted, when a user actuates a submenu option—as mentioned above—or when a user is registered but still not enrolled to the backend server or first server 200. It should be noted that the claimed user interface has also been referenced as 100 for simplifying the illustrative purpose.

A user may trigger 910, 1010 the vehicle allocation by actuating a specific button. The specific button may be a displayed touch-screen button at the displayed user interface at the vehicle 100. The displayed touch-screen button may be provided at the user interface as a consequence of a successful user registration process as shown at FIG. 8 or may be provided in the form a submenu option that the user may actuate independently of the user registration process. The specific button may further be a specific mechanical button provided at the vehicle 100. A request to allocate/pair/associate the vehicle 100 to the user is sent 920, 1020 to the backend server or first server 200 together with the necessary data to perform the allocation/pairing/association (for instance, the VIN). In this manner, the user is not required to input the cumbersome identification number of the vehicle (VIN). This reduces user input errors. As a result of the request 920 as shown in FIG. 9*a*, when the allocation of the vehicle 100 takes place immediately after the user registration, only a confirmation message 930 is required to be sent back from the backend server or first server 200 to the vehicle 100 (i.e., to the user interface) according to the proposed solution. In addition, a confirmation message 940 may optionally be sent to a device 300 of the user (being this device 300 sufficiently identified to be reached by the backend server or first server 200 in the user registration process).

By contrast, as a result of the request 1020 as shown in FIG. 9*b*, i.e., when the allocation/pairing/association of the vehicle 100 takes place independently of the user registration, a request message 930 is sent from the backend server or first server 200 to the vehicle 100 (i.e., to the user interface) to require, for example, user and password to the user. This request message 930 is displayed 940 to the user by means of the provided user interface of the vehicle 100. User and password (or other user data that allows a verification regarding the identity of the user) are input 1050 by the user at the user interface of the vehicle 100 and sent 1060 to the backend server or first server 200. As a result of a successfully validation/verification process at the backend server or first server 200, a confirmation message 1070 is sent back from the backend server or first server 200 to the vehicle 100 (i.e., to the user interface). In addition, a confirmation message 1080 may optionally be sent to a device 300 of the user (being this device 300 sufficiently identified to be reached by the backend server or first server 200 in the user registration process).

It should be noted that the operations as shown in FIGS. 9*a* and 9*b* are illustrative and may be performed contemporaneously or in a different order other than presented in FIGS. 9*a* and 9*b*.

While various embodiments have been described, it will be apparent to those of ordinary skill in the art that many more embodiments and implementations are possible. Accordingly, the disclosed embodiments are not to be restricted except in light of the attached claims and their equivalents

The invention claimed is:

1. A method for automatic enrollment of a user of a transportation vehicle to a first server, wherein the transportation vehicle comprises a system that includes at least a user interface, the method comprising:
   providing a wireless connection between the transportation vehicle and the first server;
   obtaining, via the user interface, user device data including data identifying a personal mobile device,
   automatically sending the user device data to the first server over the wireless connection in response to obtaining the user device data via the user interface;
   responsive to obtaining the user device data via the user interface of the transportation vehicle, automatically sending, from the transportation vehicle to the first server, transportation vehicle data related to the transportation vehicle over the wireless connection without user input of the transportation vehicle data via the user interface of the transportation vehicle to provide simple enrollment with reduced user actions;
   responsive to reception of transportation vehicle data at the first server, automatically generating a user account at the first server, wherein the user account includes the user data sent by the user of the transportation vehicle, and automatically generating a message at the first server, the message comprising a confirmation link, and automatically sending the message to the personal mobile device using the user device data;
   automatically sending an enrollment confirmation to the user interface of the transportation vehicle only in response to actuation of the confirmation link via the personal mobile device to provide a double confirmation opt-in, via the personal mobile device, verifying that the user data identifying the personal mobile device has correctly been associated and stored in the corresponding user account;
   receiving at the user interface the enrollment confirmation from the first server for presentation to the user, and
   automatically presenting the enrollment confirmation to the user on the user interface in response to receipt of the enrollment confirmation.

2. The method of claim 1, wherein the user account includes the data related to the transportation vehicle.

3. The method of claim 1, further comprising making available services to the user of the transportation vehicle in response to an enrollment confirmation from the first server being received at the user interface.

4. The method of claim 3, wherein the services are only made available to the user of the transportation vehicle from an external server via the first server.

5. The method of claim 3, wherein the services are made available to the user of the transportation vehicle from an external server using a secure connection.

6. The method of claim 4, wherein the services are made available to the user of the transportation vehicle from an external server using a secure connection.

7. The method of claim 1, wherein the enrolling of a user of a vehicle to a first server is triggered in response to a factory setting beings necessary, in response to a user actuating an inactive service displayed at the user interface provided at the transportation vehicle, and/or in response to a user not being enrolled.

8. The method of claim 1, wherein the vehicle data includes a vehicle identification number or verification code.

9. The system of claim 1, wherein no additional devices having user interface are required to complete enrolling of the user to the transportation vehicle for the first server.

10. A system for automatically enrolling a user of a transportation vehicle to a first server, the system comprising:
   a user interface, wherein the system is configured to:
      provide a wireless connection between the transportation vehicle and the first server;
      obtain, via the user interface, user device data including data identifying a personal mobile device,
      automatically send the user device data over the wireless connection to the first server in response to obtaining the user device data via the user interface;

automatically send, responsive to obtaining user device data via the user interface, transportation vehicle data from the transportation vehicle to the first server over the wireless connection, wherein the transportation vehicle data is related to the transportation vehicle, wherein the transportation vehicle data is automatically sent without user input of the transportation vehicle data at the user interface of the transportation vehicle to simplify enrollment with reduced user actions;

automatically generate a user account at the first server, wherein the user account includes the user data sent by the user of the transportation vehicle, and automatically generate a message at the first server responsive to reception of transportation vehicle data at the first server, the message comprising a confirmation link, and sending automatically, the message to the personal mobile device using the user device data;

automatically send an enrollment confirmation to the user interface of the transportation vehicle only in response to actuation of the confirmation link via the personal mobile device to provide a double confirmation opt-in, via the personal mobile device, verifying that the user data identifying the personal mobile device has correctly been associated and stored in the corresponding user account;

receive at the user interface the enrollment confirmation from the first server for presentation to the user, and automatically present the enrollment confirmation to the user on the user interface in response to receipt of the enrollment confirmation.

11. The system of claim 10, wherein the user account includes the data related to the transportation vehicle.

12. The system of claim 10, wherein the system is further configured to make available services to the user of the transportation vehicle in response to an enrollment confirmation from the first server being received at the user interface.

13. The system of claim 12, wherein the services are only made available to the user of the transportation vehicle from an external server via the first server.

14. The system of claim 12, wherein the services are made available to the user of the transportation vehicle from an external server using a secure connection.

15. The system of claim 10, wherein the enrolling of a user of a transportation vehicle to a first server is triggered in response to a factory setting beings necessary, in response to a user actuating an inactive service displayed at the user interface provided at the transportation vehicle, and/or in response to a user not being enrolled.

* * * * *